United States Patent [19]
Davis et al.

[11] Patent Number: 5,312,160
[45] Date of Patent: May 17, 1994

[54] VEHICLE SEAT MOUNTED HEADREST AND UTILITY CONSOLE

[75] Inventors: Larry A. Davis, 8308 Wood St., Kansas City, Kans. 66212; Dale R. Langner, Overland Park, Kans.

[73] Assignee: Larry A. Davis, Kansas City, Kans.

[21] Appl. No.: 789,942

[22] Filed: Nov. 12, 1991

[51] Int. Cl.$^5$ ............................................. A47C 1/10
[52] U.S. Cl. ................................. 297/397; 297/191; 297/188; 297/394; 297/411.25; 297/411.36
[58] Field of Search ............................. 297/144–146, 297/170, 188, 191, 194, 220, 227, 230, 231, 250, 253, 254, 283, 394, 396, 397, 399, 400, 401, 402, 404, 410, 414, 415, 255, 256; 248/118, 118.1, 118.3, 118.5; 403/109, 104, 110, 370, 371, 377

[56] References Cited

U.S. PATENT DOCUMENTS

| | | | |
|---|---|---|---|
| 2,190,395 | 2/1940 | Brady | 297/394 |
| 2,490,088 | 12/1949 | Penn | 297/401 |
| 2,533,733 | 12/1950 | Jensen | 403/104 |
| 2,615,493 | 10/1952 | Hunter . | |
| 2,650,650 | 9/1953 | Brown | 297/415 |
| 2,751,967 | 6/1956 | Sitterley | 297/256 |
| 2,986,202 | 5/1961 | Yates . | |
| 2,990,008 | 6/1961 | Bien | 297/397 |
| 3,068,048 | 12/1962 | Mahon et al. | 297/414 |
| 3,185,497 | 5/1965 | Lagace . | |
| 3,195,953 | 7/1965 | Zacks . | |
| 3,540,775 | 11/1970 | Defleur . | |
| 3,608,964 | 9/1971 | Earl . | |
| 3,690,525 | 9/1972 | Koons | 297/255 X |
| 4,097,086 | 6/1978 | Hudson . | |
| 4,383,713 | 5/1983 | Roston . | |
| 4,565,405 | 1/1986 | Mayer . | |
| 4,619,483 | 10/1986 | Dickey et al. | 297/394 X |
| 4,756,572 | 7/1988 | Dykstra et al. | 297/145 X |
| 4,813,751 | 3/1989 | Fenn . | |
| 4,904,021 | 2/1990 | Clemmer . | |

FOREIGN PATENT DOCUMENTS 1069795  7/1954  France .................. 297/414

*Primary Examiner*—Laurie K. Cranmer
*Attorney, Agent, or Firm*—Kokjer, Kircher, Bowman & Johnson

[57] ABSTRACT

A device which may be removably mounted on a back of a seat. The device includes a lower bracket and an upper compression portion connected by telescopic sleeves. The extension of the sleeves may be releasably fixed to secure the device to the seat. The device may be padded and provide lateral support for the user. Various elements may also be releasably mounted to the device, such as a head support, a utility console and a pencil holder.

18 Claims, 4 Drawing Sheets

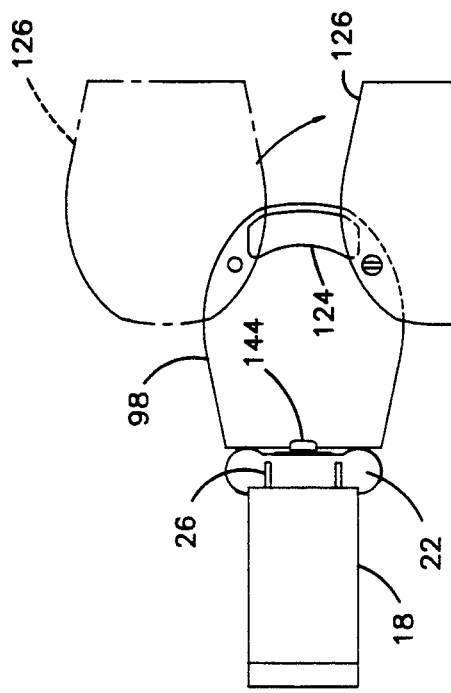
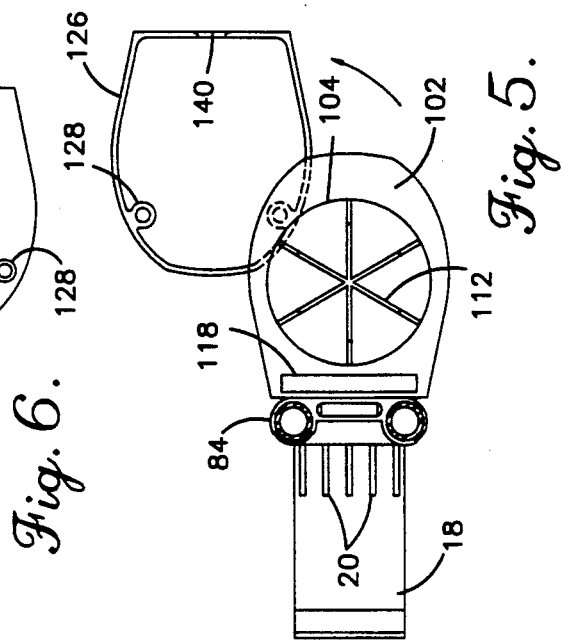
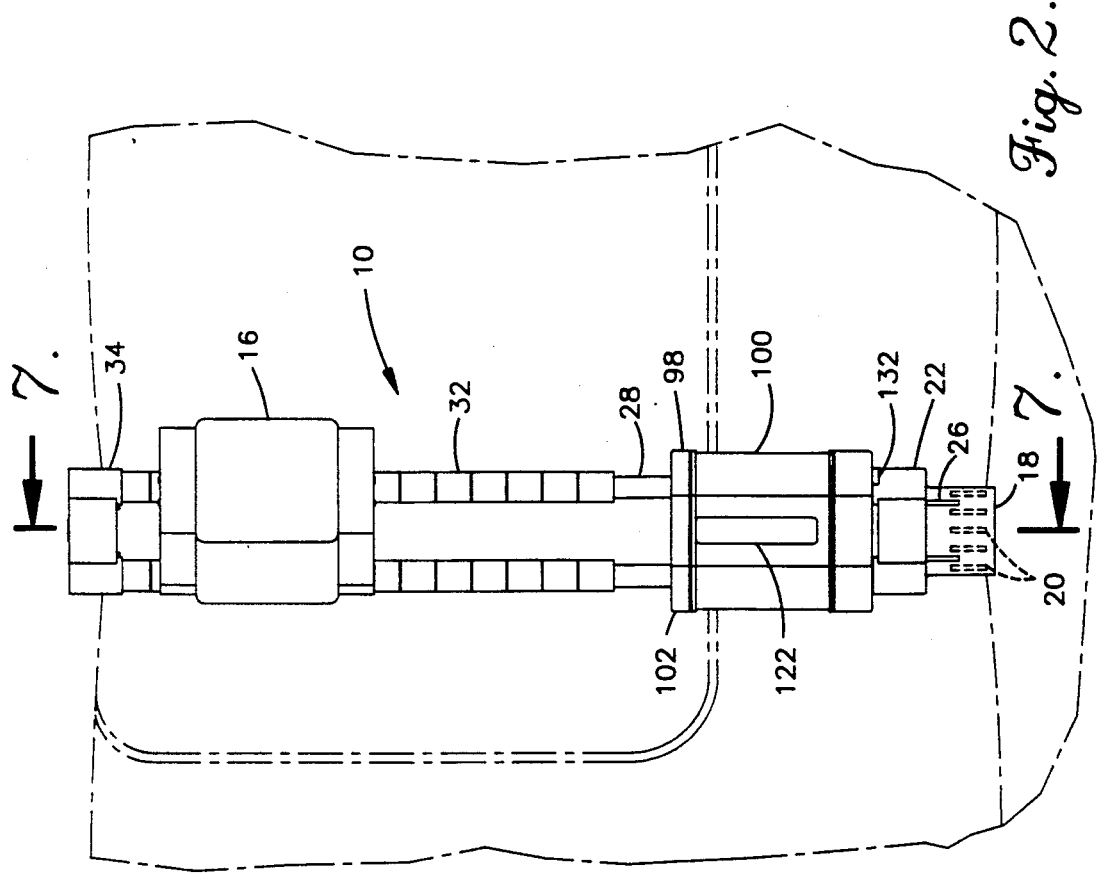

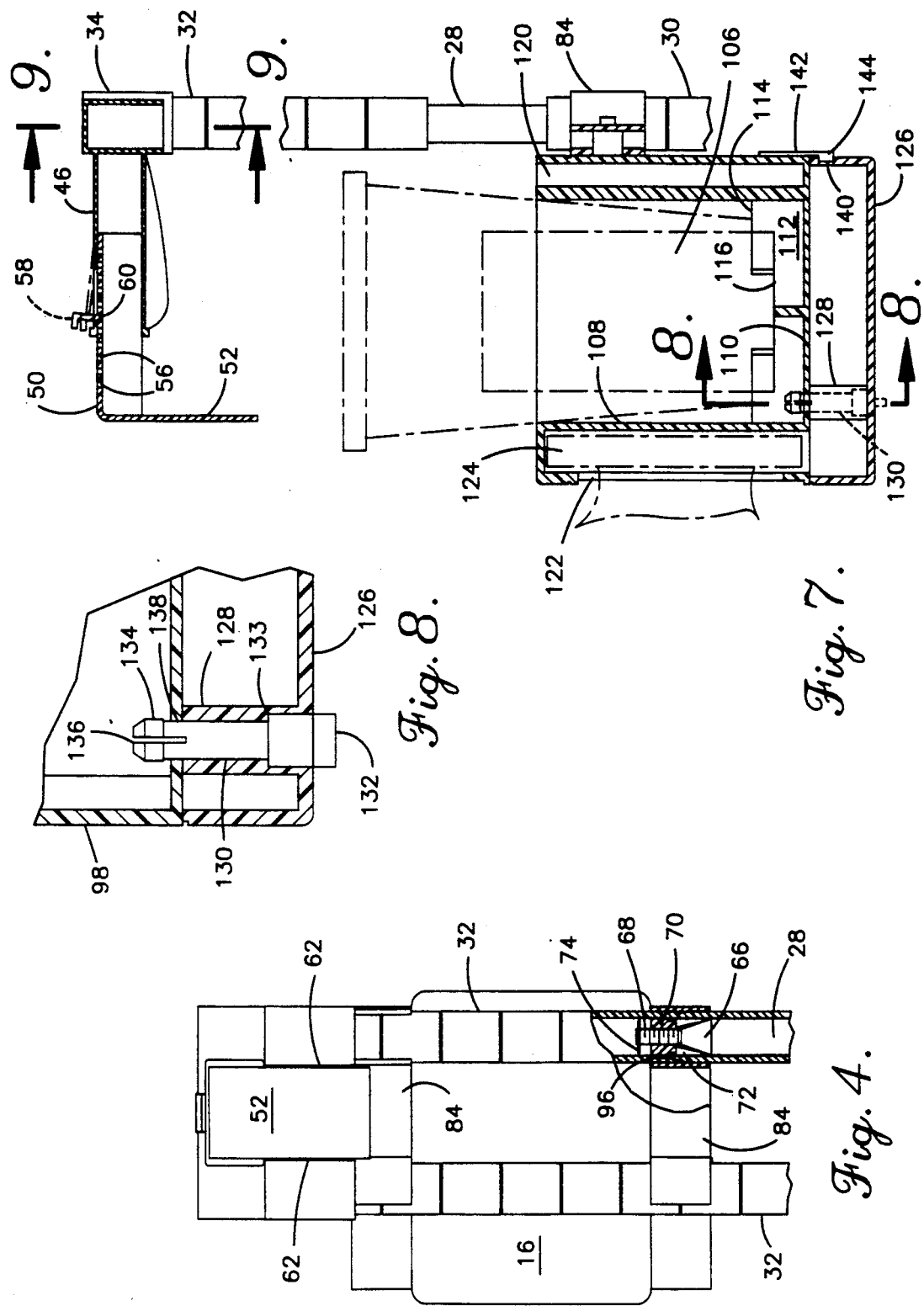

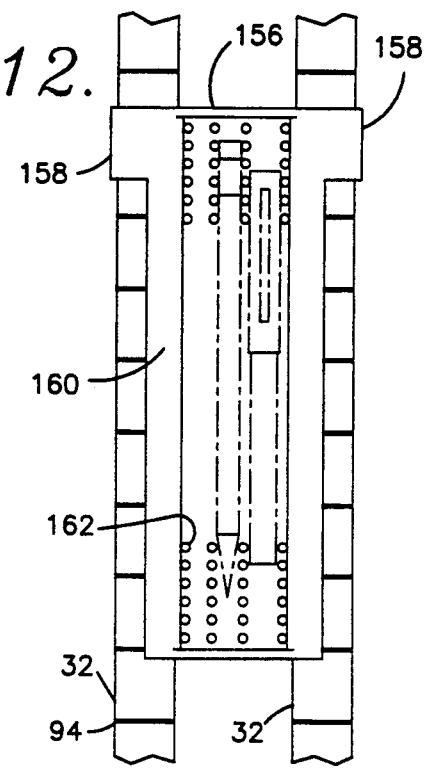
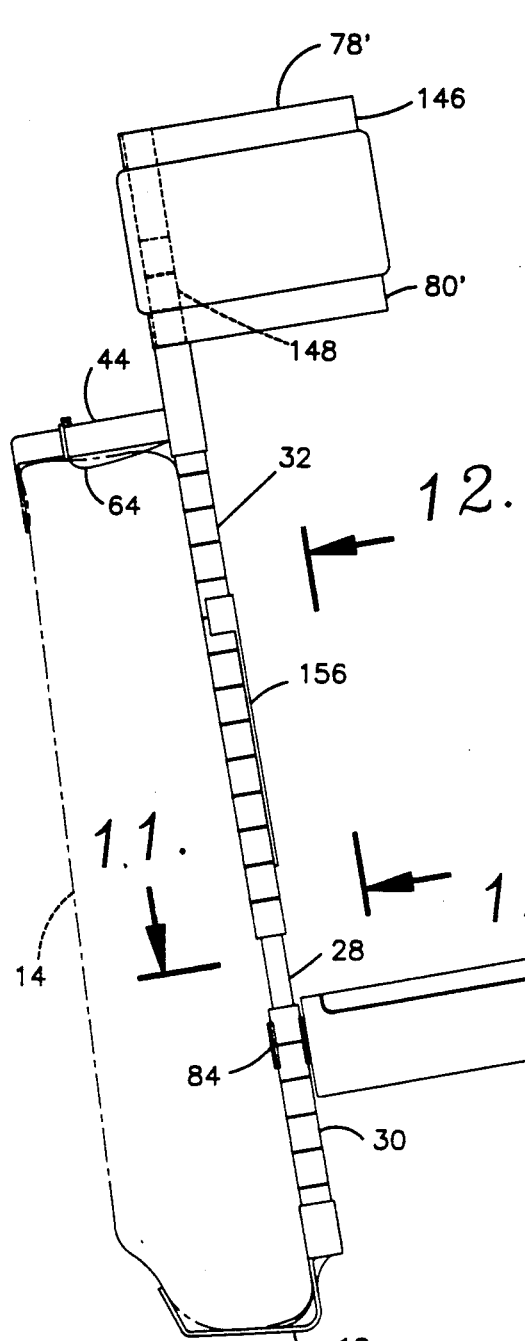
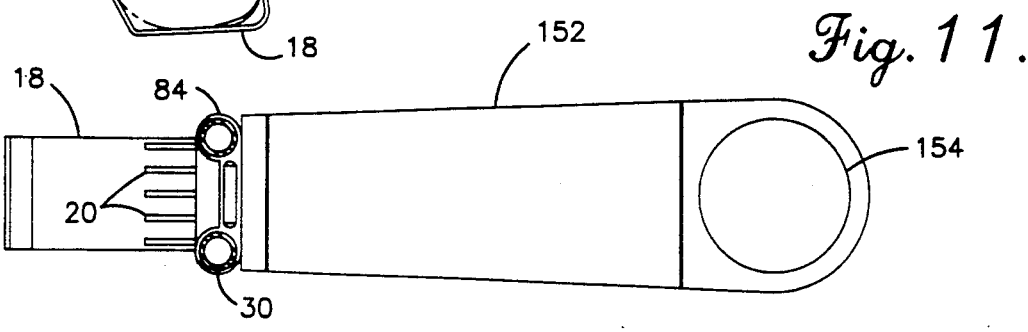

5,312,160

VEHICLE SEAT MOUNTED HEADREST AND UTILITY CONSOLE

BACKGROUND OF THE INVENTION

1. Field of the Invention

The present invention relates in general to a physical support and utility device for use with a chair or similar piece of furniture. In particular, the present invention relates to an improved side headrest and utility console combination which may be removably mounted upon a chair and in particular a vehicle seat.

2. Description of the Related Art

Chairs and like items of furniture, especially the seats used in vehicles, generally provide good support for the upper legs, buttocks, and back of the user. However, these seats typically do not provide good lateral support for the user. It is often the case that a passenger in a vehicle may become tired and wish to sleep during the journey. The lack of lateral support found in vehicle seats often results in the passenger's head, and possibly the upper body tilting toward one side as the muscles relax during sleep.

In addition to being an uncomfortable position, in vehicles this may pose a special danger. In particular, the leaning of the upper body of the passenger may cause the shoulder strap of the typical three point restraint system to be placed at a portion of the passenger's body which reduces the effectiveness of the restraint system, and possibly causing the restraint system to actually become a danger to the passenger. This problem is even more severe in the case of small children, which typically have a poor fit within the three point restraint system even before leaning of the upper body.

The passengers of vehicles would also like access to various loose articles during travel in the vehicle. It has often been the case that such articles, such as sunglasses or beverages, have simply been placed on the seat adjacent to the passenger. This may cause a danger to the passenger if the driver of the vehicle is attempting to reach such loose items and is inattentive to road conditions, and further poses the problem of damage to the loose articles or the vehicle seat.

It has been known to provide a utility console having various recesses adapted to retain loose articles with the bottom of the utility tray having a pair of weighted flaps which lie on either side of the central hump in the floor of an automobile. However, such utility consoles are difficult to reach by a passenger within a restraining system, and are not particularly stable and may be rather easily dislodged, spilling the loose items contained therein.

SUMMARY OF THE INVENTION

An object of the present invention is to provide a lateral support for a seat.

Another object of the present invention is to provide a seat support which will allow the user to rest their head thereon to provide a more comfortable position for sleeping in the seat.

Another object of the present invention is to provide such a headrest which may be removably mounted upon the chair or seat.

It is a further object of the present invention to provide such a headrest which may be vertically adjusted.

It is another object of the present invention to provide a utility console for use in a vehicle which may be removably attached to a seat.

It is yet another object of the present invention to provide a combination of the removably mounted headrest and removably mounted utility console.

These and other features are provided by a device which may be removably mounted on a back of a seat. The device includes a lower bracket and an upper compression means connected by telescopic sleeves. The extension of the sleeves may be releasably fixed to secure the device to the seat. The device may be padded and provide lateral support for the user. Various elements may also be releasably mounted to the device, such as a head support, a utility console and a pencil holder.

BRIEF DESCRIPTION OF THE DRAWINGS

The objects and features of the invention noted above are explained in more detail with reference to the drawings in which like reference numerals denote like elements, and in which:

FIG. 2 is a front view of the device of FIG. 1;

FIG. 4 is a partial rear view and partial cutaway of the device of FIG. 1;

FIG. 5 is a top view of the utility console of FIG. 1;

FIG. 6 is a bottom view of the utility console of FIG. 1;

FIG. 7 is a cross-sectional view taken along line 7—7 of FIG. 2;

FIG. 8 is a detail view of the utility console of FIG. 7;

FIG. 10 is a side view of a second embodiment according to the present invention;

FIG. 11 is a top view of the utility console of FIG. 10; and

FIG. 12 is a front view of a pencil holder of the device of FIG. 10.

DETAILED DESCRIPTION OF THE INVENTION

Figure 1:
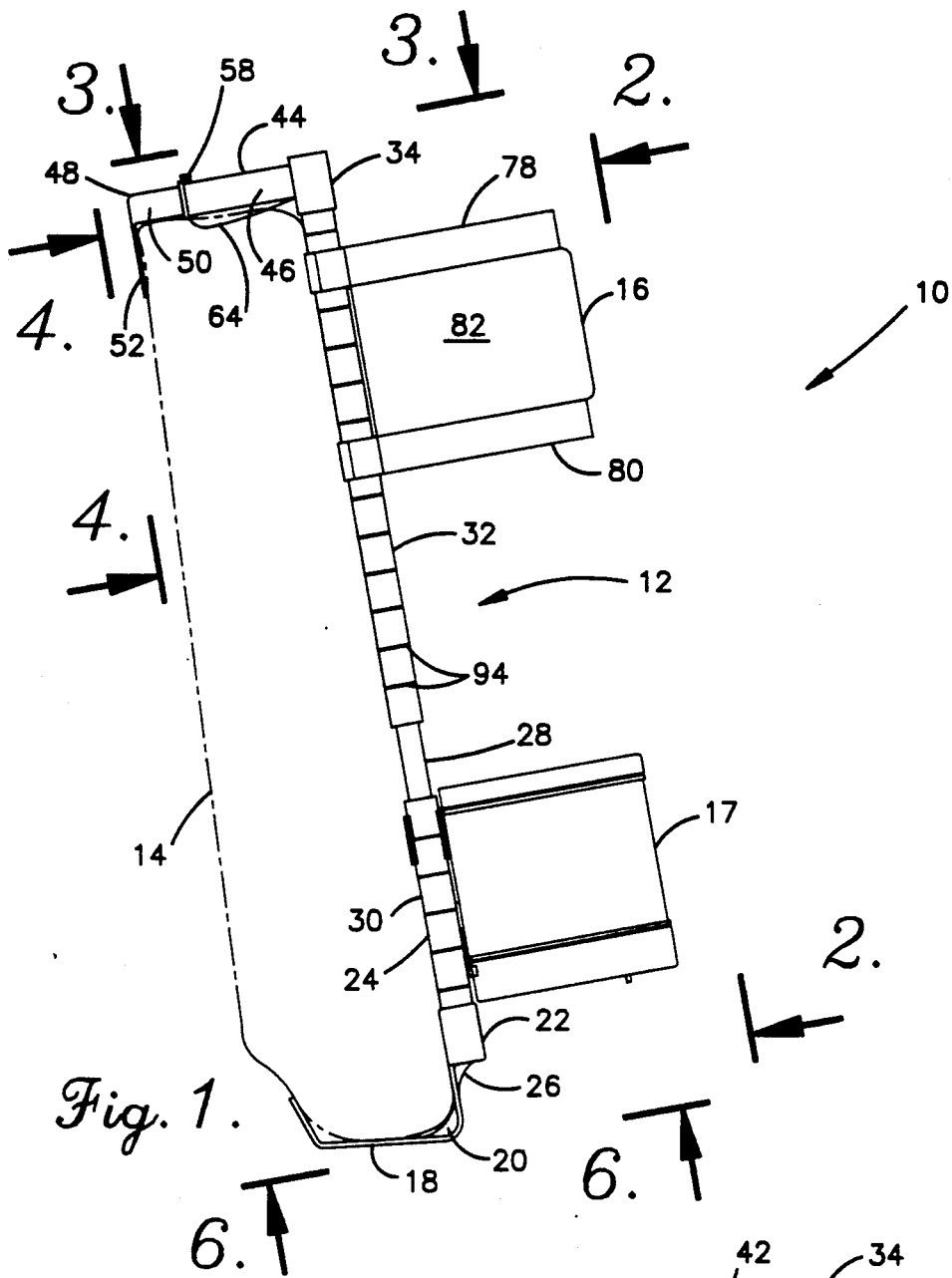
FIG. 1 is a side view of a first embodiment of the present invention.

With reference to FIGS. 1 and 2, a first embodiment of the present invention is generally designated as device 10. The device 10 generally consists of a clamping means 12 adapted to be removably mounted upon the upright back of a seat 14 and may be used with various accessories which are connected to the clamping means 12, such as a head support 16 and utility console 17.

The clamping means 12 includes a lower bracket 18 which is adapted to be placed between the lower cushion and the seat back 14. Bracket i has a generally U-shaped configuration in the side view of FIG. 1, and is adapted to extend about the lower end of the seat back 14. It is preferred that the lower bracket 18 be formed of a material which is slightly resilient to aid in the insertion of the bracket under the back of the seat. As such, it is preferred that the bracket 18 be formed of a high density plastic, although other materials, such as a plastic-coated spring metal, could be employed.

As may be readily seen from FIG. 1, the U-shaped configuration of the lower bracket 18 results in the back of the seat being received within the upstanding legs of the bracket. This configuration securely retains the bracket 18 against movement outwardly from the plane of the back of seat 14.

The lower corner of bracket 18 closest to the user preferably includes a plurality of reinforcing flanges 20. These flanges serve to reinforce the bracket against breakage due to outwardly directed forces on the upstanding legs of the bracket, and additionally, serve to inhibit movement of the bracket within the plane of the back of the seat along the lower edge of such back. In particular, the individual flanges 20 will press against the back of seat 14 providing a plurality of friction surfaces. This arrangement is particularly effective where the back of seat 14 is covered in cloth and/or is slightly padded. In such a situation the flanges 20 will tend to dig into the fabric and padding to further restrict lateral movement of bracket 18.

The upper end of bracket 18 closest to the user forms a receiving end 22 connected to at least one strut 24, discussed in more detail below. The receiving end 22 is preferably formed as a monolithic unit with the remainder of lower bracket 18 and may include appropriate reinforcement strips 26 between the receiving end 22 and the adjacent upstanding leg of bracket 18. The reinforcement strips may take a form and spacing similar to the reinforcement flanges 20.

The receiving end 22 is connected to at least one strut 24, as noted above. Strut 24 is preferably fixedly connected to end 22, and for this arrangement the receiving end 22 may have an appropriate cavity to receive the lower end of strut 24, or the receiving end 22 may have an appropriate stud received within a cavity in the end of strut 24. In either event, the strut 24 is connected to receiving end 22 such that the strut 24 extends upwardly along the back of the seat 14.

The strut 24 may have any cross-sectional configuration, but it is preferred that it be round to provide no sharp edges and thus to reduce potential injuries. While the strut 24 may be formed of many different materials, it is preferred that the strut include rigid tubing 28 for strength. To provide a more pleasing appearance and perhaps more cushioned exterior, the metal tubing 28 may be surrounded by a sheath 30, typically formed of plastic.

Where the strut 24 includes the sheath 30, the sheath extends only partially along the length of strut 24, such that a length of the metal tubing 28 is accessible at the upper free end of the strut 24.

This upper free end of strut 24 is slidably received within a sleeve 32 such that the sleeve 32 is essentially coaxial with strut 24. As such, the sleeve 32 forms an extension of strut 24 and extends further up the back of seat 14. While a first end of sleeve 32 receives the free end of strut 24, a second end of sleeve 32 is received within a head assembly 34. In particular, the sleeve 32 is mounted to head 34 such that the sleeve may rotate about its longitudinal axis with respect to head 34, but is fixed against translation along its longitudinal axis. The reason for this mounting will be apparent below, and may be effected by fixing the end of the sleeve within a collar rotatably mounted in the head 34, or by other means well known in the art.

In the preferred embodiment, the sleeve 34 is formed with a circular cross-sectional configuration for the same reasons discussed with respect to strut 24. As such, the head assembly 34 may include circular cavity 36 which receives the sleeve 32. By forming a groove 38 in the outer periphery of the sleeve 32 in a plane normal to the longitudinal axis thereof, and by providing a mating ring 40 within the cavity 36, the ring 40 may be received within the groove 38 to provide the required movement of sleeve 32. To aid in insertion of the sleeve 32 into cavity 36 the second end of the sleeve 32 may include a slot 42 cut completely through the sleeve 32 such that the end of the sleeve may be compressed slightly to pass beyond the ring 40.

Extending rearwardly from the head 34 is a compression means 44 adapted to engage and compress the upper end of the back of seat 14. The compression means 44 includes a slide tube 46, having a hollow interior which opens toward the rear, and a clamp end 48. The clamp end 48 has a generally L-shaped configuration in side view, with an adjustment leg 50 and an abutment leg 52. The adjustment leg 50 is slidably received within the slide tube 46.

To releasably fix the adjustment leg 50 with respect to the slide tube 46, the compression means 44 includes an appropriate lock means. In the preferred embodiment, the lock means takes the form of a spring tongue 54 (FIG. 3) in the slide tube 46 and a series of adjustment slots 56 in the adjustment leg 50. The spring tongue 54 may be formed integrally with the slide tube 46 by providing a U-shaped groove therein to thus define the cantilevered spring tongue 54.

The free end of the spring tongue 54 includes, at the outer side, an adjustment handle 58 which may be grasped by the user to lift the free end of the spring tongue 54 away from the adjustment leg 50. On the inner side of the free end of spring tongue 54, there is provided a locking tab 60 (FIG. 7) which will normally project into one of the adjustment slots 56. Thus, by lifting the spring tongue by manual movement of handle 58, the tab 60 will be released from the associated slot 56, allowing the adjustment leg 50 to be moved with respect to the slide tube 46. Releasing the handle 58 will then cause the tab 60 to enter one of the slots 56, fixing the compression means 44 in position.

The abutment leg 52 is best shown in FIG. 4. The leg 52 extends downwardly from the adjustment leg 50 such that it may extend behind the seat back 14. It is preferred that the abutment leg 52 have as much surface area contact with the back 14 as is possible. As such, the abutment leg 52 may be laterally longer (wider) than the adjustment leg 50. This lateral widening is of course only necessary below the bottom side of adjustment leg 50, and as such this lateral widening will be spaced from the apex of the legs 50 and 52.

While the lateral widening works well with many seat designs, it will be too large for certain seat backs. To allow for variations in seat construction, the abutment leg 52 may be provided with break grooves 62, defining reduced thickness areas which act as lines of weaks at various locations to allow the user to remove portions of the abutment leg 52 by manually bending and breaking to provide a proper fit, or to allow the abutment leg 52 to extend between the backside of the seat 14 and a rear deck, as is common in the rear seat of an automobile. The break grooves may allow removal of the lateral extensions of the leg 52, and/or reduce the length of leg 52.

The underside of slide tube 46 may include a plurality of gripping ribs 64. These ribs 64 are shown in side view in FIGS. 1 and 10, and preferably are of approximately the same size and spacing as the reinforcement flanges 20. Like the reinforcement flanges 20, the gripping ribs will tend to bite into the top end of the back 14 to prevent lateral movement of the compression means 44 and head 34, and thus the upper end of the sleeve 32.

As may be readily appreciated, for the flanges 20 and ribs 64 to extend or bite into the ends of the back of seat 14 with a sufficient amount of force to prevent lateral movement of the device, the device must be compressed about the back 14 in a substantially vertical direction.

Various means could be employed to bring the head 34 and receiving end 22 together to provide such a compressive force. For example, tension springs could extend through the strut 24 and sleeve 32, urging the head and receiving end together. However, to provide a sufficient force of compression, the springs must have such a high spring constant as to make expansion of the device 10 to fit about the back of seat 14 unduly difficult for a user.

Alternatively, threads could be provided between the metal tubing 28 and sleeve 32, such that rotation of the sleeve 32 would cause translation of the sleeve 32 with respect to strut 24. While this arrangement is clearly workable the number of rotations of sleeve 32 required to obtain any appreciable compression would be quite large and thus tiresome to the user.

A preferred means for providing for this compressive force is shown in FIG. 4. This figure shows the metal tubing 28 telescopically received within the interior of sleeve 32. The free end of tubing 28 includes a frustoconical portion 66 tapering towards the free end of tubing 28. Extending outwardly from the portion 66 and forming the free end of tubing 28 is a threaded extension 68.

Operatively engaged with the threads of extension 66 is an expansion nut 70. The outer peripheral configuration of expansion nut 70 corresponds to the interior configuration of the sleeve 32 and is sized such that nut 70 will have a close sliding fit within sleeve 32. Mounted on, and preferably monolithically formed with, the expansion nut 70 are a plurality of wedges 72 which taper away from the free end of tubing 28. As such, the wedges 72 may act with the frustoconical portion 66 such that rotation of the sleeve 32 will cause rotation of nut 70, which will in turn cause relative movement between the wedges 72 and portions 66. As the nut 70, and thus the wedges 72, approach the portion 66, the wedges 72 will be forced outwardly due to the configuration of portion 66. The wedges 72 will therefore expand radially outwardly and contact the interior of sleeve 32 with increasing force.

This force will eventually raise to the level that continued rotation of sleeve 32 with respect to tubing 28 is restricted due to the wedges 72. At this point the telescopic movement of sleeve 32 with respect to tubing 28 is restricted for similar reasons, as may be readily seen. Rotation of the sleeve 32 in the opposite direction will cause the nut 72 to move away from the frustoconical portion 66, thus moving the wedges from their interfering position, and allowing telescopic movement. To prevent the nut 7 from being completely removed from extension 68 by excessive rotation, a collar 74 may be fixed to the free end of extension 68.

As may be seen from the above description, in use the user will rotate the sleeve 32 until telescopic movement of the sleeve with respect to the tubing 28 is possible. The user will then expand the device 1 to a size which will readily fit over the back 14. The user will then insert the bracket 18 between the seat portion and the back 14. Care will be taken to ensure that the lower end of the seat 18 rests within the confines of the U-shaped lower bracket.

The user will then make the necessary adjustments such that the compression means 44 is placed at a setting where the abutment leg 52 may be easily placed behind the back 14. The user will then slide the sleeve 32 downwardly with respect to the tubing 28, bringing the compression means 44 into contact with the top end of the back of seat 14. Pressure will be placed on the head 34 such that the gripping ribs 64 compress into the top end of the seat 14.

While maintaining this compression, the sleeve 32 is rotated to cause rotation of expansion nut 70 and engagement of the wedges 72 against the interior of sleeve 32. When sufficient engagement has been achieved, the pressure on the head 34 may be released without causing relative movement between the sleeve 32 and tubing 28. As such, compression will be maintained between the top and bottom ends of the back 14.

At this point the compression mean 44 may be adjusted by lifting adjustment handle 58 and bringing the clamp end 48 as close as possible to the head 34. The handle 58 is then released causing the tab 60 to enter one of the adjustment slots 56. At this point pressure will be applied between the front and back faces of the back 14. It may thus be seen that the device is securely locked to the back of seat 14, but by reversing the above procedure may be easily removed or moved to a different location.

It should be noted that, as indicated in FIG. 2, the compression used to maintain the device in position will cause slight deformation of the seat back 14. This deformation is believed to be advantageous at the lower end of the seat back, as it ensures that the lower bracket 18 is in tight contact with the seat back. This places the lower bracket at a position which will not interfere with the movement or use of the seat belts of a vehicle.

To enable the device 10 to be used with a variety of seat sizes, it may be readily seen that the amount of adjustment available in the device 10 corresponds directly to the length of the sleeve 32. For example, when the device is in its most compressed position, the expansion nut 70 will be adjacent the top end of sleeve 32, whereas it will be adjacent the bottom end of sleeve 32 when the device is in its most expanded position. As a practical matter, the range of adjustment necessary is not particularly large. As such, the sheaf 30 will typically be employed about the metal tubing 28, even though abutment of the lower end of sleeve 32 with the sheaf 30 will prevent further entry of the tubing 28 into the sleeve 32, thus reducing adjustability.

To reduce the cost of the device by reducing the amount of assembly required, it is preferred that the elements be formed as monolithic units wherever possible, such that a single injection molding step may form multiple elements. This may be employed with the entire lower end of the device for example. Specifically, the lower bracket 18, flanges 20, receiving end 22, strips 26, tubing 28, sheath 30, portion 66 and threaded extension 68 may be formed as a monolithic unit of injection molded plastic. Of course, in such an arrangement the tubing and sheath would not be separate elements, but the tubing would extend upwardly from the sheath. Other examples of monolithic formation are possible, such as head assembly 34 and slide tube 46.

While the outer peripheral configuration of the sleeve and sheath are preferably round, the outside diameter of these members may be varied widely. As such, the device as described to this point may have an outer diameter of approximately 4-6 inches, and thus be employed as a lateral support for the user in and of itself. In such instances, it may be preferable to provide a layer of padding and/or cloth to the exterior of the sleeve 32 and possibly the sheath 30.

While a large diameter sleeve and sheath may be employed per se as a lateral support, it is preferred if these elements are formed with smaller diameters with that the device as described to this point may be employed as a base for further elements.

Figure 3:
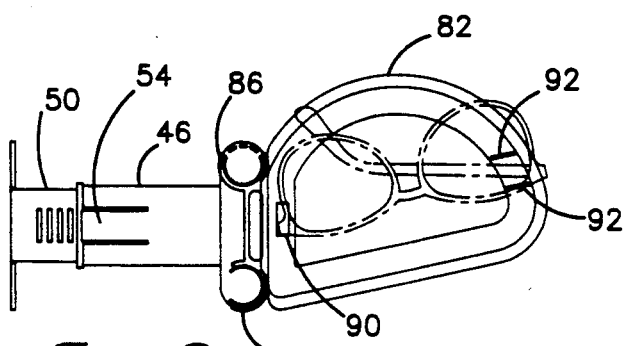
FIG. 3 is a top view of the device of FIG. 1.
Figure 9:
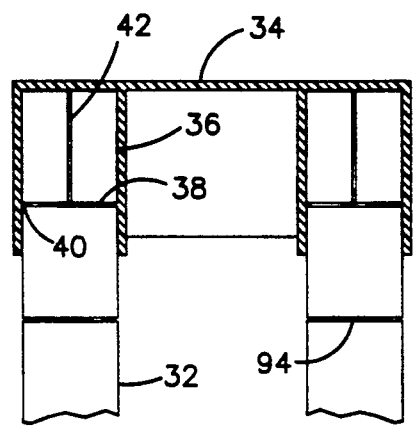
FIG. 9 is a detail view of the device of FIG. 1.

In particular, the lateral head support 16 may be formed as a separate member which is removably fixed to the sleeve 32 or sheath 30. As shown in FIGS. 1-3, head support 16 may have top and bottom end caps 78, 80, respectively, which help to retain a padded portion 82. It is this padded portion 82 which provides the lateral support for the user. As is best shown in FIG. 3, the head support 16 has a generally D-shaped cross-sectional configuration. In particular, a curved portion extends towards the user to provide support for the user's head. It is preferred that this curved portion extend a fair distance beyond the outer periphery of the sleeve 32 such that it may extend over the user's shoulder. In this manner, the head support may be employed without the user leaning against the sleeve 32, which might cause discomfort. Opposite the curved side, the headrest includes a substantially flat side tapering towards the user in the direction away from the back 14. This reduces the amount of space occupied by the head support on the side opposite the user. In this manner, a second passenger, who is not a user, does not have his sitting space compromised.

The head support 16 is preferably releasably connected to the sleeve 32. Additionally, to ensure that the head support does not rotate about the longitudinal axis of sleeve 32, it is preferred that the device 10 include a pair of sleeves 32 as shown in FIG. 2, with the head support being connected to both sleeves. This may be easily provided by simply forming each of the receiving end 22 and head assembly 34 with a pair of spaced cavities similar to those previously described.

Various means could be employed to attach the head support to the sleeves 32. In the preferred embodiment, at least on pivot clip 84 is fixed to the head support. The pivot clip 84 is best shown in FIG. 3, and includes a pair of spaced C-shaped clasps, referenced as first clasp 86 and second clasp 88. Each of the clasps is of a size to frictionally engage a portion of the outer periphery of a associated sleeve 32, and is oriented such that the longitudinal axis of the C-shaped clasp is substantially coaxial to that of sleeve 32.

As may be seen in FIG. 3, the clasps 86 and 88 are rotated with respect to each other such that the removed portion of each clasp falls at a different angular location. Specifically, the removed portion of clasp 86 is directed towards the user, while the removed portion of second clasp 88 is directed towards the back 14. This angular offset allows the pivot clip 84 to be easily attached and removed from the pair of sleeves 32, yet provides a secure fit when the clasp is in place.

In use, the first clasp 86 will be forced onto the associated sleeve 32 and then the entire head support 16 rotated about the clasp 86 to bring the clasp 88 into position to force it on the remaining sleeve 32. As may be seen from consideration of FIG. 3, this arrangement will ensure that the pivot clip 84 is difficult to remove except by reversing the above-noted operation. To ensure stability of the head support 16, it is preferred that a pivot clip 84 is provided at each of the top caps 78 and bottom cap 80.

To increase the utility of the head support 16, the top and bottom caps 78 and 80 may be provided with a glasses cutout 90. Cutout 90 is sized to receive the bow or ear piece of a pair of glasses, with the earpiece extending substantially parallel to the longitudinal axis of the sleeves 32, within a cavity in the head support. In this manner, when the other bow or ear piece of the pair of glasses is folded to the inoperative position, as shown in FIG. 3., the pair of glasses will be retained on the upper side of the head support 16. To further enhance the stability of the glasses while resting in this position, the outer end of the top and bottom caps may include a pair of glasses abutments 92 which will serve to limit horizontal pivoting of the pair of glasses about the ear piece received in cutout 90.

The provision of the cutout 90 on each of the caps 78 and 80 is of course optional, however, it does point out that the head support 16 may be placed in a configuration opposite to that shown in FIG. 3 such that the bottom cap 80 is uppermost rather than lowermost. This will alter the location of the curved cushion portion of the support, switching the operative side of the device 10. This may of course be effected without removing the device 10 from the back 14.

The frictional fit between the clasps of the pivot clips 84 and the sleeves 32 may be sufficient to prevent unwanted movement of the head support 16 in a direction parallel to the longitudinal axes of the sleeves 32. However, the sleeves and pivot clips may be provided with means for positively preventing such movement.

In particular, the sleeves 32 may be formed with a plurality of peripheral stop grooves 94 which extend in a plane substantially perpendicular to the longitudinal axes of the sleeves 32, and are spaced from each other along such axes. The interior of the clasps 86 and 88 may thus be provided with a stop rib 96 (FIG. 4) sized to be retained within the stop grooves 94. As such, after the pivot clip 84 has been received about the sleeves 32, the head support 16 may be slid along the sleeves 32 a short distance until the stop ribs 96 engage with stop grooves 94 and thus releasably secure the head support in position.

While the interior of both of the clasps 86 and 88 may be provided with the stop ribs 96, this may make it unduly difficult to manually slide the head support along the sleeve after engagement of the stop ribs. This may require that the support be removed to move it an appreciable distance. To obviate this problem, it may be preferred to provide only second clasp 88 with such a stop rib. In this manner, the clasp 88 may be removed from the sleeve 32 while the clasp 86 is maintained in position, the head support moved to the proper location along the longitudinal axes, and the second clasp thereafter applied and the rib 96 engaged with groove 94. This would eliminate the need to totally remove the head support to adjust its position over several of the stop grooves 94.

The stop grooves may also serve a second function. Specifically, the groves may act as weakened areas which allow the sleeves 32 to be broken therealong thus reducing the length of the sleeves. This may be employed as an adjustment measure. For example, the device may be provided with sleeves 32 which are sufficiently long to be used with seat backs 14 which are quite high. This length would, however, prevent the device from being compressed a sufficient distance to be employed with short backs 14, due to abutment between the sleeves 32 and sheaths 30. However, by removing a length of the sleeves 32, the user could modify the device to the proper size.

It should be apparent that forming the sleeves as breakable along the stop grooves will compromise the strength of the device 10. As such, only a few of the stop grooves adjacent the lower end of the sleeve may be formed as breakable. Alternatively, the stop grooves may be employed merely as saw guides, without being breakable.

A further item which may be used with the device 10, with or without the head support 16, is the utility console 17, shown in FIGS. 1, 2 and 5–7. The console 17 consists of a main body 98 having substantially vertical sides and generally oblong cross-sectional periphery. I the preferred embodiment, the substantially vertical sides are formed in the main by a continuous sidewall 100 which extends about the periphery of the console. A top 102 is connected to the sidewall 100 and is best shown in FIG. 5.

The top includes a circular cup opening 104 which defines the opening for a cup cavity 106 having a substantially circular sidewall 108 and a bottom 110. Extending upwardly from the bottom 110 and radially outward from the center of the cavity 106 are a plurality of cup ribs 112. Each cup rib 112 includes an outer portion 114 and an inner portion 116. As is best shown in FIG. 7, the outer portion 114 extends upwardly a greater extent than the inner portion 116. As such, the interior edge of each outer portion 114 defines a secondary cavity within the cavity 106. As shown by the dash lines in FIG. 7, the diameter of the interior ends of the outer portions 114 are sized such that they may closely receive a standard beverage can. The upper horizontal edges of the outer portions 114 may also provide a support for a standard shaped cup, such as a large 32 ounce cup commonly available. In this manner, the console 17 may carry a wide range of sizes of beverage containers.

Alternatively or additionally, the utility console may include a slot extending downwardly through the main body sidewall 100 and the cup cavity sidewall 108. Such a slot would allow a cup having a handle to be placed within the cavity 106, with the handle of the cup extending outwardly through such a slot.

Also formed within the top 102 is an upper slot 118 which defines the opening of a secondary cavity 120 within the main body 98. This cavity and upper slot may take many shapes and sizes, but it is preferred that the secondary cavity 120 is shaped and sized to receive a standard sized pocket tablet.

In addition to the cavities formed within the top 102, the sidewall 100 may include a tissue slot 122 which opens into a tissue cavity 124. The tissue cavity 124 is preferably sized to receive a standard size travel packet of facial tissues. The slot 122 allows the next available tissue to extent outwardly from the console for easy access by the user.

While the main body, top and various cavities may be formed of multiple elements, it is possible that the top, sidewall and cavities be formed as a monolithic unit as shown in FIG. 7.

To provide further storage, the console 17 may include a utility drawer 126. The drawer 126 preferably has a peripheral configuration corresponding to that of the sidewall 108 and, while the drawer may be slideable, is preferably pivoted to the main body 98.

As is best shown in FIGS. 5–8, drawer 126 consists of a bottom and a peripheral sidewall and includes at least one pivot cylinder extending upwardly from the bottom of the drawer to a height essentially corresponding to that of the sidewalls of the drawer. Within the pivot cylinder is a through hole which includes a downwardly directed shoulder 133. A pivot pin 130 is slidably received within this through hole to fix the drawer to the main body 98.

A first end of the pivot end 130 includes a tab 132 which may be manually grasped by the user. The second, opposite end of the pin includes an enlarged diameter section 134, which preferably includes a tapered end. Additionally, a stress slot 136 is formed through the pivot pin from the second end to a position at least a short distance beyond the portion 134. The second end also includes a shoulder which mates with the shoulder 133 within the pivot cylinder 128.

In operation, the pivot pin will extend upwardly through the pivot cylinder 12 and the increased diameter section will pass through a pivot hole 138 and the bottom of the main body 98. The increased diameter portion 134 will serve to prevent the pin from being withdrawn through the hole 138, and the shoulder 133 will prevent the drawer from moving downwardly with respect to the pivot pin 130. As such, the drawer 126 may pivot about the pivot pin 126 to open and close the drawer.

The slot 136 in the pin allows the portion 134 to flex inwardly and thus easily pass through the hole 138. Additionally, should undue pressure be applied to the drawer 126 when it is in the open position, the slot 136 will allow the pivot pin to be removed from the hole 138 without damage. In this manner, the drawer may be simply reattached and work as originally intended.

As best shown in FIG. 6, the pivot drawer preferably includes a pair of pivot cylinders 128, and the main body preferably includes a pair of pivot holes 138. In this manner the user may remove the pivot pin from the hole 138 and associated pivot cylinder by grasping the tab 132, and thereafter insert the pivot pin through the other pivot cylinder and pivot hole, thus allowing the drawer to pivot into an open position on the opposite side of the console 17. This ensures that the open drawer will not impinge upon the seat area of a passenger which is not the user.

To maintain the drawer in the closed position it is preferred that a latch mechanism is provided. This may be affected by forming a latch slot 140 within the rear of the sidewall of the drawer 126 and by providing a depending latch 142 having a mating tongue 144. The mating tongue will provide an interference fit within the latch slot 140. As such, when the drawer 126 is pivoted to the closed position the mating tongue 144 will be forced into the latch slot 140 to thus maintain the drawer in the closed position.

The utility console may be removably fixed to the device by means of one or more pivot clips 84 connected to the console and used in a manner similar to that described above. The console is typically placed adjacent the bottom of the back 14, and as such will usually be connected to the sheaths 30 rather than to the sleeves 32. To allow fixing the console along the longitudinal axes of the sheaths, the sheaths may be provided with stop grooves similar to those employed with the sleeves.

A variation or second embodiment of the invention is shown in FIGS. 10-12, with like reference numerals representing like elements.

As shown in FIG. 10, a head support 146 is shown extending upwardly from the sleeves 32. This arrangement would likely be preferable for use by adults, as the head of adults typically extends above the top end of the seat of a vehicle. In this arrangement a head assembly 34' extends upwardly beyond the compression means 44 and includes means for releasably attaching the head support 146. This means may advantageously comprise a pair of support prongs 148 each having a substantially circular cross-sectional configuration and being substantially coaxial with the sleeves 32. The head support 146 will include appropriate cavities in the bottom cap 80' and top cap 78' to receive the support prongs 148. By providing cavities in each of the cap members, the support 146 may be reversed as in the previous embodiment.

Alternatively, the head support 16 of FIG. 1 could be enlarged slightly to include the cavities as in the head support 146, and additionally include the pivot clips 84, and the head assembly 34 could include appropriate cavities therein coaxial with the sleeves 32. With such an arrangement the support 16 could be employed with the clips 84 as first described, or be used with a pair of adapter prongs inserted within the cavities of the head assembly 34, similar to the arrangement shown in FIG. 10. In this manner a single head support could be provided and attached for use either with a child or an adult.

As shown in FIGS. 10 and 11, a utility console 150 may take the form of an elongated member similar to a standard arm rest. The upper portion of console 150 may include a padded portion 152, which could form the pivoted closure of a compartment for loose articles. The free end of the console 150 may include a cup holder 154 which may be of a design similar to that shown in FIG. 5, or may take another form. As with the previous utility console, it is preferred that the console 150 be removably mounted to the device by the use of one or more pivot clips 84.

A further item which may be employed with the present device is a pencil holder 156. The pencil holder 156 is generally an elongated rectangular member sized to fit between the pair of sleeves 32. A pivot clip 84 may be connected to the holder 156, or the holder may be provided with integral clasps 158 having configurations and orientations similar to the clasps 86 and 88, such that the pencil holder may be removably mounted in the manner described above.

The pencil holder preferably includes a back wall 160 from which a plurality of cylindrical wedge extensions 162 extend. The wedge extensions are preferably aligned in a plurality of rows with multiple extensions 162 per row. The extensions 162 are formed of a slightly resilient material such that a pencil or pen may be pushed between adjacent rows of extensions 162 and be wedged therebetween. It is also possible that the holder 156, integral clasps 158, back wall 160 and wedge extensions 162 may be formed as a single monolithic plastic unit.

The above invention is believed to increase user comfort and convenience. In addition, the use of the head support may increase safety in a vehicle, as it reduces the possibility that the body of the passenger will be in a tilted position where the effectiveness of a three point restraint system is reduced. It should be noted, however, that no safety testing of such a safety feature has been undertaken or proven.

From the above description it should be apparent that many variations are possible in the present invention and are included in the scope thereof. For example, the console may have various configurations and may be employed without the head support on the device 10. A particular example of a console variation would be a planar surface to act as a table or writing surface. The periphery of such surface could be contoured to not interfere with normal operations such a driving the vehicle, but could allow the vehicle operator to write or fill out forms easily and quickly. Alternatively or additionally, straps could be connected to the device by loops connected to a pivot clip, with the straps allowing books, packages or other items to be secured to the device, and thus to the seat.

Variations in the head support are also possible. For example the size or peripheral configuration could be varied. If preferred, the entire head support could be padded for comfort and safety. Additional items could be incorporated into the headrest (or console), such as an adjustable reading light or a radio or other means of entertainment.

Additionally, while the present device has been shown connected to the back of a seat such that it will be adjacent to the user, it should be noted that the present invention may be attached to the rear face of a seat back, such as to the rear of a front seat of an automobile, such that it is in front of a user in the rear seat.

From the foregoing it will be seen that this invention is one well adapted to attain all ends and objects herein above set forth together with the other advantages which are obvious and which are inherent in the structure.

It will be understood that certain features and subcombinations are of utility and may be employed without reference to other features and subcombinations This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. In combination, a support adapted to mount to a back of a seat, the seat back generally defining a rectangular plane, and a lateral head rest, said support comprising:
   a bracket adapted to extend substantially normal to the plane and abut against a first horizontally extending end of the plane;
   leg means adapted to extend substantially normal to the plane and engage a second horizontally extending end of the plane;
   means, extending between and substantially perpendicular to said bracket and said leg means, allowing relative movement of said bracket and said leg means in a direction substantially perpendicular to said ends and parallel to the plane, comprising
      two struts extending outwardly from said bracket and having free ends, said struts adapted to extend substantially parallel to the plane toward the second end;
      two sleeves extending outwardly from said leg means and having free ends, said sleeve adapted to extend substantially parallel to the plane toward the first end, and each being telescopically received by an associated one of said struts; and means for releasible fixing said means allowing relative movement and thus fixing the position of said bracket with respect to said leg means, comprising two means for fixing, each associated with one of said sleeves, and said lateral head rest comprising:

a cushioned member including a substantially vertical face extending outwardly from the plane and having a vertical extent much less than that of said extending means, and adapted to provide lateral support to a user's head when the user is setting upon the seat with the user's back supported by the plane; and clip means mounted on said cushioned member and adapted to releasible retain said cushioned member on said means extending between said bracket and said compression means at one of several possible positions along said direction, and wherein said clip means comprises a pivot clip having first and second clasps, each of said clasps having an inner periphery substantially corresponding to an outer periphery of an associated one of said sleeves, being slightly resilient, and having a portion thereof removed whereby said associated sleeve may be removably received within said inner periphery of said clasp.

2. The combination of claim 1, wherein said portion is removed from said first clasp along a plane substantially perpendicular to the plane of the seat back, and wherein said portion is removed from said second clasp along a plane substantially parallel to the plane of the seat back.

3. The combination of claim 2, wherein said sleeves each include a plurality of grooves extending about the periphery thereof and spaced along the longitudinal axes of said sleeves to define said several possible positions, and wherein at least said second clasp includes a mating rib within said inner periphery, whereby said mating rib may be received within said groove to prevent movement of said clasp, and thus said cushioned member, along the longitudinal axes of said sleeves.

4. In combination, a support adapted to mount to a back of a seat, the seat back generally defining a rectangular plane, and a utility console, said support comprising:

a bracket adapted to extend substantially normal to the plane and abut against a first horizontally extending end of the plane;

leg means adapted to extend substantially normal to the plane and engage a second horizontally extending end of the plane;

means, extending between and substantially perpendicular to said bracket and said leg means, allowing relative movement of said bracket and said leg means in a direction extending substantially perpendicular to the ends and parallel to the plane, comprising two struts extending outwardly from said bracket and having free ends, said struts adapted to extend substantially parallel to the plane toward the second end;

two sleeves extending outwardly from said leg means and having free ends, said sleeve adapted to extend substantially parallel to the plane toward the first end, and each being telescopically received by an associated one of said struts; and means for releasible fixing said means allowing relative movement and thus fixing the position of said bracket with respect to said leg means, comprising two means for fixing, each with one of said sleeves, and console comprising:

at least one side wall extending about the periphery of said console;

a top;

a cup holder cavity opening into said top; and clip means mounted on said console and adapted to releasible retain said console on said means extending between said bracket and said compression means at one of several possible locations along said direction, and wherein said clip means comprises a pivot clip having first and second clasps, each of said clasps having an inner periphery substantially corresponding to an outer periphery of an associated one of said sleeves, being slightly resilient, and having a portion thereof removed whereby said associated sleeve may be removably received within said inner periphery of said clasp.

5. The combination of claim 4, wherein said portion is removed from said first clasp along a plane substantially perpendicular to the plane of the seat back, and wherein said portion is removed from said second clasp along a plane substantially parallel to the plane of the seat back.

6. The combination of claim 5, wherein said struts each include a plurality of grooves extending about the periphery thereof and spaced along the longitudinal axes of said sleeves to define said several locations, and wherein at least said second clasp includes a mating rib within said inner periphery, whereby said mating rib may be received within said groove to prevent movement of said clasp, and thus said console, along the longitudinal axes of said struts.

7. The combination of claim 6, in further combination with a lateral head rest, said head rest comprising:

a cushioned member including a substantially vertical face extending outwardly from the plane and having a vertical extent much less than that of said extending means and adapted to provide lateral support to a user's head; and clip means mounted on said cushioned member and adapted to releasible retain said cushioned member on said means extending between said bracket and said compression means at one of several possible positions along said direction.

8. A support adapted to mount to a back of a seat, the seat back generally defining a rectangular plane, comprising:

a bracket adapted to extend substantially normal to the plane and abut against a first horizontally extending end of the plane;

leg means adapted to extend substantially normal to the plane and engage the second horizontally extending end of the plane;

means, extending between, and substantially perpendicular to, said bracket and said leg means, allowing relative movement of said bracket and said leg means in a direction substantially perpendicular to the ends and parallel to the plane, said means extending between said bracket and said leg means comprising at least one strut extending outwardly from said bracket and having a free end, said strut adapted to extend substantially parallel to the plane toward the second end of the seat back;

at least one sleeve extending outwardly from said leg means and having a free end, said sleeve adapted to extend substantially parallel to the plane toward the first end of the seat back, and to telescopically receive said at least one strut; and means for releasible fixing of said means allowing relative movement and thus fixing the position of said bracket with respect to said leg means, said means for releasible fixing comprising means for releasible fixing said sleeve with respect to said strut to prevent telescopic movement therebetween.

9. A support as in claim 8, wherein said at least one strut comprises two struts, said at least one sleeve comprises two sleeves, and said means for fixing comprises two means for fixing, each said strut and fixing means being associated with one of said sleeves, and wherein each said associated struts and sleeves are arranged in spaced substantially parallel relation and adapted to extend substantially parallel to the plane.

10. A support as in claim 9, wherein said means for releasible fixing comprises:

at least one of said at least one sleeve being connected to said leg means for rotation about the longitudinal axis of said sleeve;

a frustoconical portion on said free end of an associated one of said at least one strut and a threaded extension extending outwardly from said portion and both being substantially coaxial with said strut;

an expansion nut operatively engaged on said threaded extension, said expansion nut engaging an interior of said sleeve with sufficient friction such that rotation of said sleeve will normally cause rotation of said nut about said threaded extension but will allow sliding movement of said sleeve with respect to said nut along the longitudinal axis of said sleeve; and at least one wedge connected to said nut and adapted to coact with said frustoconical portion such that movement of said nut toward said portion will cause radially outward movement of said wedge into engagement with the interior of said sleeve and thus prevent telescopic movement of said sleeve with respect to said strut, and movement of said nut away from said portion will disengage said wedge from said sleeve and allow the telescopic movement.

11. A support as in claim 9, wherein said leg means is further adapted to compress the seat back in a direction substantially normal to the plane, and comprises:

a head assembly adapted to abut against a first face of the seat back in a direction normal to the plane;

a slide tube extending substantially normal to the plane and adapted to abut against one of the ends of the seat back;

an adjustment leg slidably received within said slide tube;

an abutment leg connected to said adjustment leg and adapted to contact the seat back at the second face of the seat back in a direction normal to the plane; and means for releasible fixing of said adjustment leg with respect to said slide tube, whereby compression between the faces of the seat back in a direction normal to the plane may be maintained.

12. In combination, a support adapted to mount to a back of a seat, the seat back generally defining a rectangular plane, and a lateral head rest, said support comprising:

a bracket adapted to extend substantially normal to the plane and abut against a first horizontally extending end of the plane;

leg means adapted to extend substantially normal to the plane and engage the second horizontally extending end of the plane;

means, extending between, and substantially perpendicular to, said bracket and said leg means, allowing relative movement of said bracket and said leg means in a direction substantially perpendicular to the ends and parallel to the plane; and means for releasible fixing of said means allowing relative movement and thus fixing the position of said bracket with respect to said leg means; and said lateral head rest comprising:

a cushioned member including a substantially vertical face extending outwardly from the plane and having a vertical extent much less than that of said plane and being adapted to provide lateral support to a user's head when the user is sitting upon the seat with the user's back supported by the plane; and clip means mounted on said cushioned member and adapted to releasible retain said cushioned member on said means extending between said bracket and said leg meant at one of several possible positions along said direction.

13. The combination of claim 12, wherein said means extending between said bracket and said leg means comprises at least one strut extending outwardly from said bracket and having a free end, said strut adapted to extend substantially parallel to the plane toward the second end of the seat back;

at least one sleeve extending outwardly from said leg means and having a free end, said sleeve adapted to extend substantially parallel to the plane toward the first end of the seat back, and to telescopically receive said at least one strut; and wherein said means for releasible fixing comprises means for releasible fixing said sleeve with respect to said strut to prevent telescopic movement therebetween.

14. A support as in claim 13, wherein said means for releasible fixing of said means permitting relative movement comprises:

at least one of said at least one sleeve being connected to said leg means for rotation about the longitudinal axis of said sleeve;

a frustoconical portion on said free end of an associated one of said at least one strut and a threaded extension extending outwardly from said portion and both being substantially coaxial with said strut;

an expansion nut operatively engaged on said threaded extension, said expansion nut engaging an interior of said sleeve with sufficient friction such that rotation of said sleeve will normally cause rotation of said nut about said threaded extension but will allow sliding movement of said sleeve with respect to said nut along the longitudinal axis of said sleeve; and at least one wedge connected to said nut and adapted to coact with said frustoconical portion such that movement of said nut toward said portion will cause radially outward movement of said wedge into engagement with the interior of said sleeve and thus prevent telescopic movement of said sleeve with respect to said strut, and movement of said nut away from said portion will disengage said wedge from said sleeve and allow the telescopic movement.

15. In combination, a support adapted to mount to a back of a seat, the seat back generally defining a rectangular plane, and a utility console, said support comprising:
   a bracket adapted to extend substantially normal to the plane and abut against a first horizontally extending end of the plane;
   leg means adapted to extend substantially normal to the plane and engage the second horizontally extending end of the plane;
   means, extending between, and substantially perpendicular to, said bracket and said leg means, allowing relative movement of said bracket and said leg means in a direction substantially perpendicular to the ends and parallel to the plane; and
   means for releasible fixing of said means allowing relative movement and thus fixing the position of said bracket with respect to said leg means; and said utility console comprising:
   at least one side wall extending about the periphery of said console;
   a top;
   a cup holder cavity opening into said top; and
   clip means mounted on said console and adapted to releasible retain said console on said means extending between said bracket and said compression means at one of several possible locations along said direction.

16. The combination of claim 15, wherein said cupholder cavity includes a bottom having a first diameter, and a second cavity opening into said bottom and having a diameter smaller than said first diameter, said second cavity diameter being sized to retain a standard soft drink beverage can.

17. The combination of claim 15, wherein said means extending between said bracket and said leg means comprises
   at least one strut extending outwardly from said bracket and having a free end, said strut adapted to extend substantially parallel to the plane toward the second end of the seat back;
   at least one sleeve extending outwardly from said leg means and having a free end, said sleeve adapted to extend substantially parallel to the plane toward the first end of the seat back, and to telescopically receive said at least one strut; and wherein
   said means for releasible fixing comprises means for releasible fixing said sleeve with respect to said strut to prevent telescopic movement therebetween.

18. The combination of claim 15, in further combination with a lateral head rest, said head rest comprising:
   a cushioned member including a substantially vertical face extending outwardly from the plane and having a vertical extend much less than that of said extending means adapted to provide lateral support to a user's head; and
   clip means mounted on said cushioned member and adapted to releasible retain said cushioned member on said means extending between said bracket and said compression means at one of several possible positions along said direction.

* * * * *